(12) United States Patent
Han et al.

(10) Patent No.: US 11,476,945 B2
(45) Date of Patent: Oct. 18, 2022

(54) APPARATUS FOR GENERATING OPTICAL SIGNAL OF MULTI-CHANNEL

(71) Applicant: ELECTRONICS AND TELECOMMUNICATIONS RESEARCH INSTITUTE, Daejeon (KR)

(72) Inventors: Sang-Pil Han, Daejeon (KR); Sungil Kim, Daejeon (KR); Jaegyu Park, Daejeon (KR); Minhyup Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 17/219,269

(22) Filed: Mar. 31, 2021

(65) Prior Publication Data

US 2021/0328681 A1 Oct. 21, 2021

(30) Foreign Application Priority Data

Apr. 17, 2020 (KR) .......................... 10-2020-0046679

(51) Int. Cl.
| | | |
|---|---|---|
| *H04B 10/516* | (2013.01) | |
| *H04B 10/50* | (2013.01) | |
| *H04B 10/548* | (2013.01) | |
| *H04B 10/54* | (2013.01) | |

(52) U.S. Cl.
CPC ....... *H04B 10/5161* (2013.01); *H04B 10/503* (2013.01); *H04B 10/54* (2013.01); *H04B 10/548* (2013.01)

(58) Field of Classification Search
None
See application file for complete search history.

(56) References Cited

U.S. PATENT DOCUMENTS

| | | | |
|---|---|---|---|
| 6,147,799 A * | 11/2000 | MacDonald | ........... G02B 26/06 |
| | | | 359/857 |
| 6,748,172 B2 | 6/2004 | Lyu | |
| 7,450,861 B2 | 11/2008 | Kim et al. | |
| 10,523,333 B2 | 12/2019 | Lee et al. | |

(Continued)

FOREIGN PATENT DOCUMENTS

KR   1020060056472 A   5/2006

*Primary Examiner* — David W Lambert
(74) *Attorney, Agent, or Firm* — Rabin & Berdo, P.C.

(57) ABSTRACT

Disclosed is a multi-channel optical signal generating apparatus, which includes a CW laser that generates a single optical signal, an optical signal processor unit that processes the single optical signal, an oscillator that generates an electrical signal, and an electrical signal processor unit that generates a modulation signal, based on the electrical signal, and the optical signal processor unit includes 'n' optical circulators, at least one optical intensity modulator, (m-1) optical phase modulators, and 'n' BiODLs, the electrical signal processor unit includes a RF power divider which divides the electrical signal, and 'm' RF power amplifiers, the RF power divider divides the electrical signal into 'm' divided electrical signals, and the optical signal processor unit modulates and outputs the single optical signal by the at least one optical intensity modulator and the (m-1) optical phase modulators, based on the 'm' divided electrical signals divided from the RF power divider.

18 Claims, 10 Drawing Sheets

(56) References Cited

U.S. PATENT DOCUMENTS

| | | | | |
|---|---|---|---|---|
| 2010/0142942 A1* | 6/2010 | Rhee | .................. | H04Q 11/0005 398/45 |
| 2013/0050795 A1* | 2/2013 | Qiu | ...................... | G02F 1/3536 359/238 |
| 2014/0254619 A1* | 9/2014 | Ataie | .................. | H04B 10/506 372/28 |
| 2016/0077403 A1* | 3/2016 | Metcalf | .................... | G02F 2/02 359/326 |
| 2016/0087716 A1* | 3/2016 | McKinney | ............. | H04B 10/00 398/25 |
| 2018/0348435 A1* | 12/2018 | Yao | ........................ | G02B 5/122 |
| 2019/0278155 A1* | 9/2019 | Plascak | .................. | G02F 1/353 |
| 2019/0310498 A1 | 10/2019 | Xu et al. | | |
| 2021/0072616 A1* | 3/2021 | Zhang | .................... | G02F 1/365 |

\* cited by examiner

APPARATUS FOR GENERATING OPTICAL SIGNAL OF MULTI-CHANNEL

CROSS-REFERENCE TO RELATED APPLICATIONS

This application claims priority under 35 U.S.C. § 119 to Korean Patent Application No. 10-2020-0046679 filed on Apr. 17, 2020, in the Korean Intellectual Property Office, the disclosures of which are incorporated by reference herein in their entireties.

BACKGROUND

Embodiments of the present disclosure described herein relate to optical communication, and more particularly, relate to a multi-channel optical signal generating apparatus for transmitting a multi-band signal.

A multi-channel optical signal refers to a wavelength multiplexed Continuous Wave (CW) optical signal having a uniform frequency repetition. The multi-channel optical signal may have a short pulse of a few femtoseconds to picoseconds or less. The multi-channel optical signal may be used in various fields such as wavelength division multiplexing (WDM) optical communication, microwave photonic filters, frequency spectroscopy, low-noise frequency synthesizers, and arbitrary waveform generators.

A single optical signal generated from a CW laser may be used to generate the multi-channel optical signal. The multi-channel optical signal may be generated based on the principle of generating a harmonic wave having a uniform frequency repetition and a flat signal level. As an example, the multi-channel optical signal may be generated by inputting the single optical signal to an optical intensity modulator to amplitude-modulate the optical signal, and by inputting the amplitude modulated optical signal to an optical phase modulator to phase-modulate the optical signal. Accordingly, an apparatus for generating the multi-channel optical signal is composed of the CW laser, the optical intensity modulator (IM), the optical phase modulator (PM), and a number of radio frequency (RF) components.

In generating the multi-channel optical signal, as the frequency repetition to be implemented increases, an expensive optical component and RF component should be used in the multi-channel optical signal generating apparatus. Therefore, to commercialize the multi-channel optical signal, it is necessary to lower the cost by reducing the number of optical components and RF components constituting the multi-channel optical signal generating apparatus. In addition, there is a need for a technology to reduce power consumption and heat generated when the multi-channel optical signal generating apparatus is driven.

SUMMARY

Embodiments of the present disclosure provide an apparatus that generates a multi-channel optical signal by electro-optic modulating a single optical signal generated by a CW laser.

According to an embodiment of the present disclosure, a multi-channel optical signal generating apparatus includes a CW laser that generates a single optical signal, an optical signal processor unit that processes the single optical signal, an oscillator that generates an electrical signal, and an electrical signal processor unit that generates a modulation signal for modulating the single optical signal, based on the electrical signal, and the optical signal processor unit includes 'n' optical circulators, at least one optical intensity modulator, (m-1) optical phase modulators, and 'n' Bidirectional inline Optical Delay Lines (BiODLs), the electrical signal processor unit includes a RF power divider which divides the electrical signal, and 'm' RF power amplifiers, the RF power divider divides the electrical signal into 'm' divided electrical signals, and the optical signal processor unit modulates and outputs the single optical signal by the at least one optical intensity modulator and the (m-1) optical phase modulators, based on one of the 'm' divided electrical signals.

According to an embodiment, each of the 'n' BiODLs may include an input/output port, an optical collimator, and a mirror.

According to an embodiment, the mirror may be movable in a horizontal direction within each of the 'n' BiODLs.

According to an embodiment, a moving distance of the mirror may be proportional to a frequency repetition of generated multi-channel optical signals.

According to an embodiment, the 'n' may be 5, and the 'm' may be 3.

According to an embodiment, the CW laser may be a semiconductor laser diode.

According to an embodiment, each of the 'n' optical circulators may adjust an optical path clockwise.

According to an embodiment, the at least one optical intensity modulator may include a Direct Current (DC) voltage input port.

According to an embodiment of the present disclosure, a multi-channel optical signal generating apparatus includes a CW laser that generates a single optical signal, an oscillator that generates an electrical signal, a RF power divider that generates a plurality of divided electrical signals by distributing the electrical signal, a first block including a first RF power amplifier that amplifies a first divided electrical signal of the plurality of divided electrical signals, an optical intensity modulator that modulates an amplitude of the optical signal, based on the amplified first divided electrical signal, and a first BiODL that adjusts phases of the amplitude modulated optical signal to be in phase and reflects the optical signal adjusted to be in phase, a first optical circulator that adjusts a path of the optical signal, of which the amplitude is modulated and the phase is adjusted by the first block, a second block including an RF phase shifter that adjusts a phase of a second divided electrical signal of the plurality of divided electrical signals, a second RF power amplifier that amplifies the phase adjusted second divided electrical signal, an optical phase modulator that modulates a phase of the optical signal of which path is adjusted by the first optical circulator, based on the amplified second divided electrical signal, and a second BiODL that adjusts phases of the phase modulated optical signal to be in phase and reflects the optical signal adjusted to be in phase, and a second optical circulator that adjusts a path of the optical signal, of which the phase is modulated and adjusted by the second block.

According to an embodiment, each of the first BiODL and the second BiODL may include an input/output port, an optical collimator, and a mirror.

According to an embodiment, the mirror may be movable in a horizontal direction within each of the first BiODL and the second BiODL.

According to an embodiment, a moving distance of the mirror may be proportional to a frequency repetition of generated multi-channel optical signals.

According to an embodiment, the CW laser may be a semiconductor laser diode.

According to an embodiment, the optical intensity modulator may include a DC voltage input port.

According to an embodiment of the present disclosure, a multi-channel optical signal generating apparatus includes a CW laser that generates a single optical signal, an oscillator that generates an electrical signal, a RF power divider that generates a plurality of divided electrical signals by distributing the electrical signal, an optical circulator that adjusts a path of the optical signal, at least one amplitude modulator including a first RF power amplifier and an optical intensity modulator, and that modulates an amplitude of the optical signal by the optical intensity modulator, based on a first divided electrical signal amplified by the first RF power amplifier among the plurality of divided electrical signals, at least one optical phase modulator including an RF phase shifter, a second RF power amplifier, and an optical phase modulator, and that modulates a phase of the optical signal by the optical phase modulator, based on a second divided electrical signal which is phase adjusted by the RF phase shifter and amplified by the second RF power amplifier among the plurality of divided electrical signals, and a BiODL that adjusts phases of the amplitude and phase modulated optical signal which is modulated by the at least one amplitude modulator and the at least one optical phase modulator to be in phase, and reflects the optical signal adjusted to be in phase.

According to an embodiment, the BiODL may include an input/output port, an optical collimator, and a mirror.

According to an embodiment, the mirror may be movable in a horizontal direction within the BiODL.

According to an embodiment, a moving distance of the mirror may be proportional to a frequency repetition of generated multi-channel optical signals.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
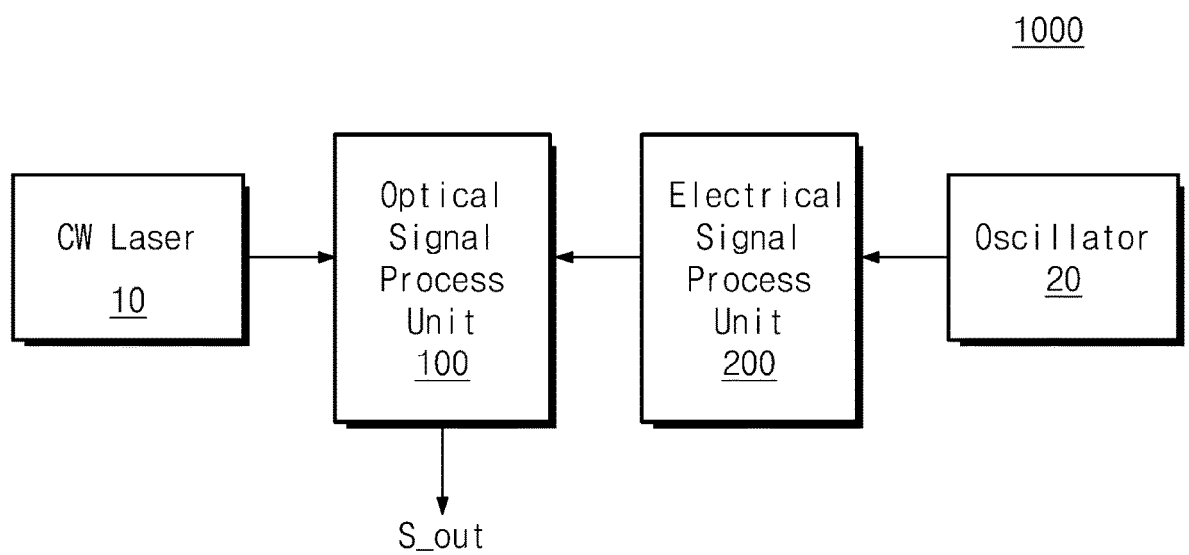
FIG. 1 is a block diagram illustrating a multi-channel optical signal generating apparatus according to an embodiment of the present disclosure.

Hereinafter, embodiments of the present disclosure will be described clearly and in detail such that those skilled in the art may easily carry out the present disclosure.

The terms used in the present specification are for describing embodiments, and are not intended to limit the present disclosure. In the present specification, the singular form also includes the plural form unless otherwise specified in the phrase. As used herein, "comprises and/or comprising" does not exclude the presence or addition of one or more other components, steps, operations and/or elements to the mentioned components, steps, operations and/or elements.

Unless otherwise defined, all terms (including technical and scientific terms) used in the present specification may be used as meanings commonly understood by those skilled in the art to which the present disclosure pertains. In addition, terms defined in the commonly used dictionary are not interpreted ideally or excessively unless explicitly defined specifically. In the present specification, the same reference numerals may refer to the same components throughout the entire text.

FIG. 1 is a block diagram illustrating a multi-channel optical signal generating apparatus according to an embodiment of the present disclosure.

Referring to FIG. 1, a multi-channel optical signal generating apparatus 1000 according to an embodiment of the present disclosure may include a CW laser (Continuous Wave laser) 10, an optical signal processor unit 100, an electrical signal processor unit 200, and an oscillator 20.

The CW laser 10 may generate a single optical signal which is a CW (Continuous Wave). For example, the CW laser 10 may be a semiconductor laser diode or a diode-pumped CW solid laser. The single optical signal generated by the CW laser 10 may be input to the optical signal processor unit 100. The optical signal processor unit 100 may include a plurality of optical components. As an embodiment of the present disclosure, it is described that the CW laser 10 is used as a light source for generating the single optical signal, but a light source other than the CW laser 10 may be used.

The oscillator 20 may generate an electrical signal. The oscillator 20 may output the generated electrical signal to an electrical signal processor unit 200. The electrical signal processor unit 200 may include a plurality of RF (Radio Frequency) components. The electrical signal processor unit 200 may generate a modulation signal, based on the electrical signal generated by the oscillator 20. The electrical signal processor unit 200 may output the modulation signal to the optical signal processor unit 100. As an embodiment of the present disclosure, it is described that the oscillator 20 is used as a configuration for generating the electrical signal, but an electrical signal generation source other than the oscillator 20 may be used.

The optical signal processor unit 100 may modulate the single optical signal input from the CW laser 10, based on the plurality of optical components included in the optical signal processor unit 100 and the modulation signal input from the electrical signal processor unit 200. In addition, the optical signal processor unit 100 may adjust an optical path in the process of modulating the single optical signal input from the CW laser 10. The optical signal processor unit 100 may modulate the single optical signal into a multi-channel optical signal S_out and may output the multi-channel optical signal S_out to the outside.

Figure 2:
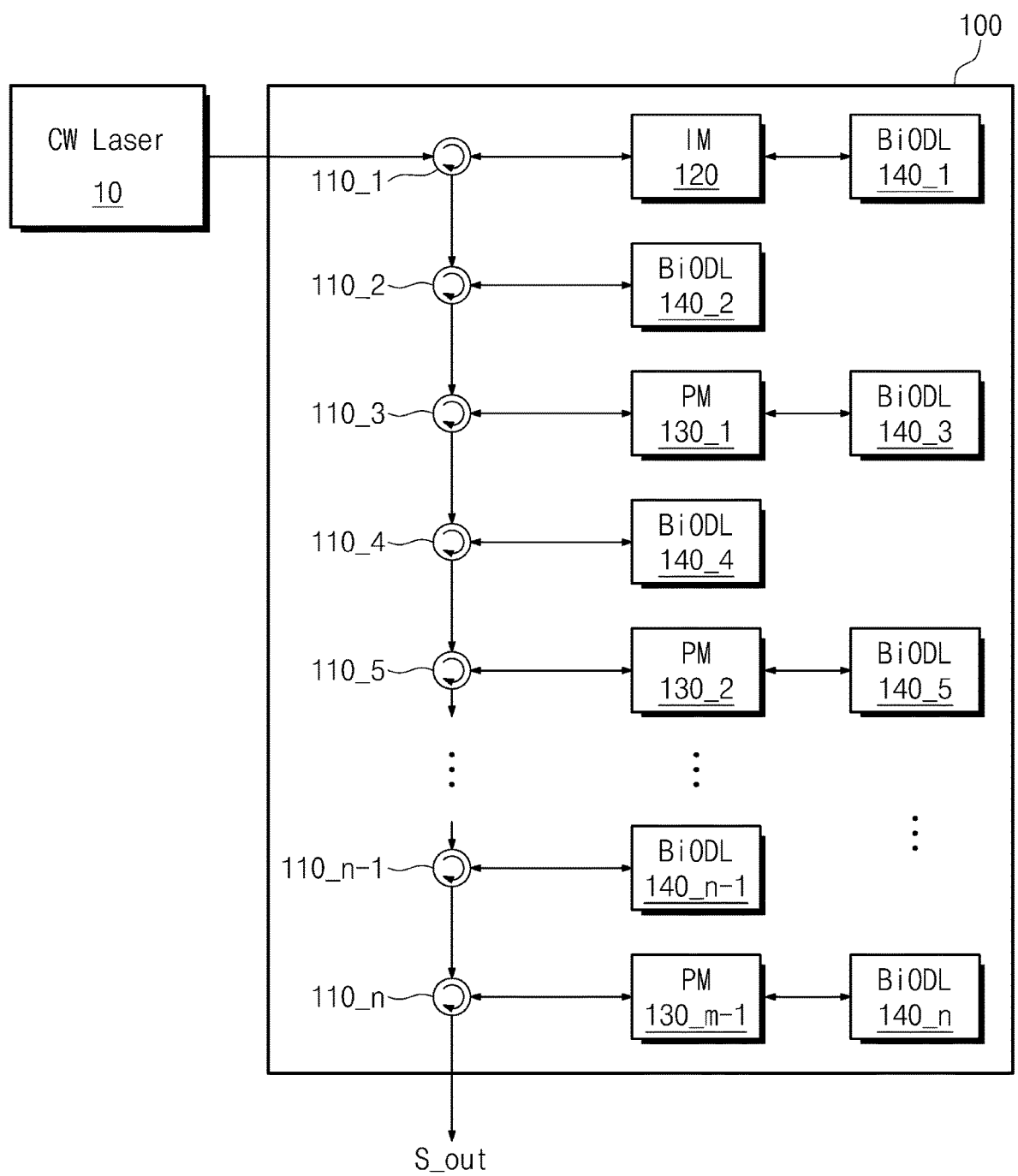
FIG. 2 is a diagram illustrating an optical signal processor unit according to an embodiment of the present disclosure.

FIG. 2 is a diagram illustrating an optical signal processor unit according to an embodiment of the present disclosure.

Referring to FIG. 2, the optical signal processor unit 100 may include a plurality of optical circulators 110_1, 110_2, ..., 110_n-1, and 110_n (where 'n' is an integer of 3 or more), an IM 120, a plurality of PM 130_1, 130_2, ..., and 130_m (where 'm' is an integer of 1 or more), and a plurality of BiODLs 140_1, 140_2, ..., and 140_n.

The optical circulators 110_1, 110_2, ..., 110_n-1, and 110_n may adjust the path of the optical signal. Referring to FIG. 2, the single optical signal input from the CW laser 10 to the first optical circulator 110_1 may be output in a clockwise direction and may be input to the optical intensity modulator 120. In addition, the single optical signal input to the optical intensity modulator 120 may be re-inputted to the optical intensity modulator 120 through the first BiODL 140_1. The optical signal re-inputted to the optical intensity modulator 120 may be re-inputted to the first optical circulator 110_1. The optical signal re-inputted to the first optical circulator 110_1 may be output in the clockwise direction and may input to the second optical circulator 110_2. In detail, the plurality of optical circulators 110_1, 110_2, ..., 110_n-1, and 110_n illustrated in FIG. 2 may output a signal correspondingly input to them in the clockwise direction.

The optical intensity modulator 120 may modulate the intensity of an input optical signal. In detail, the optical intensity modulator 120 may modulate an amplitude of the input optical signal. The single optical signal generated by the CW laser 10 may be input to the optical intensity modulator 120 through the first optical circulator 110_1. The optical intensity modulator 120 may modulate the intensity of the input single optical signal. The intensity-modulated optical signal may be output to the first BiODL 140_1.

The BiODLs 140_1, 140_2, ..., and 140_n may adjust a phase of the input optical signal. The first BiODL 140_1 may adjust phases of the intensity-modulated optical signals provided from the optical intensity modulator 120 to be in phase. In addition, the first BiODL 140_1 may re-input the phase-adjusted optical signal to the optical intensity modulator 120. The optical signal re-inputted to the optical intensity modulator 120 may be output to the second optical circulator 110_2 through the first optical circulator 110_1, and the optical signal input to the second optical circulator 110_2 may be input to the second BiODL 140_2 to adjust the phase, and then re-input to the second optical circulator 110_2. The configuration and operation principle of the BiODLs 140_1, 140_2, ..., and 140_n will be described in detail later with reference to FIG. 3.

The optical phase modulators 130_1, 130_2, ..., and 130_m may modulate a phase of the input optical signal. Referring to FIG. 2, the first optical phase modulator 130_1 according to an embodiment of the present disclosure may receive the optical signal output from the third optical circulator 110_3. The first optical phase modulator 130_1 may modulate the phase of the input optical signal and may output it to the third BiODL 140_3 to adjust the phase of the optical signal. The phase-adjusted optical signal may be output from the third BiODL 140_3 and may be input to the fourth optical circulator 110_4 through the third optical circulator 110_3. The optical signal input to the fourth optical circulator 110_4 may be input to the fourth BiODL 140_4 to adjust the phase, and then may be re-input to the fourth optical circulator 110_4.

Figure 3:
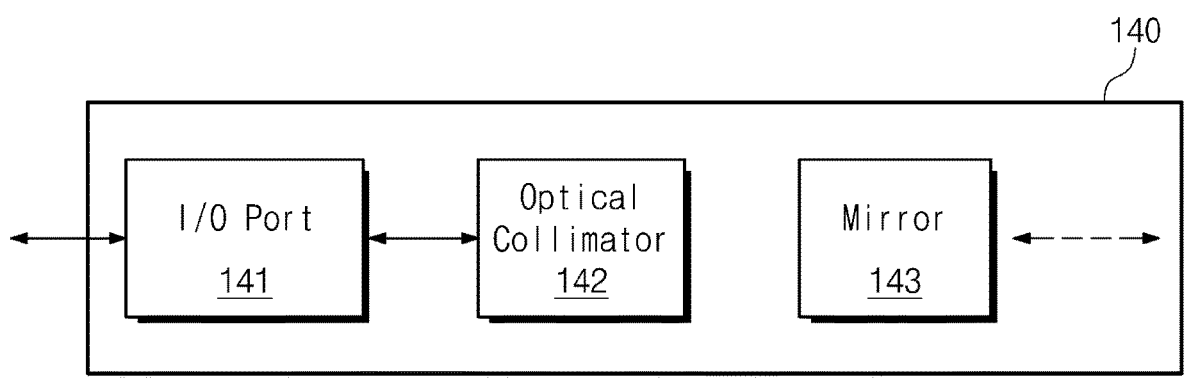
FIG. 3 is a block diagram illustrating a BiODL according to an embodiment of the present disclosure.

FIG. 3 is a block diagram illustrating a BiODL according to an embodiment of the present disclosure.

Referring to FIG. 3, a BiODL 140 may include an input/output port 141, an optical collimator 142, and a mirror 143. The optical signal may be input from the outside to the BiODL 140 through the input/output port 141, and the optical signal may be output from the BiODL 140 to the outside. The optical collimator 142 may adjust the optical path of the input optical signal in parallel. The mirror 143 may reflect the input optical signal. The mirror 143 may move along the direction of the arrow indicated by a dotted line in FIG. 3.

When the optical signal from the outside is input to the BiODL 140 through the input/output port 141, the optical signal may enter the optical collimator 142. The optical signal may be adjusted to parallel rays by the optical collimator 142. The parallel rays output from the optical collimator 142 may be vertically reflected by the moving mirror 143. The reflected optical signal may also be the parallel rays. The optical signal reflected from the mirror 143 may be re-input to the optical collimator 142. The optical collimator 142 may re-adjust the optical path of the optical signal reflected from the mirror 143. The optical signal path-adjusted by the optical collimator 142 may be output to the outside through the input/output port 141.

A polarization of the optical signal input to the BiODL 140 and the optical signal reflected and output may be maintained. The BiODL 140 may function to adjust phases of the modulated optical signal to be in phase. The frequency repetition of the multi-channel optical signal generated from the multi-channel optical signal generating apparatus 1000 (refer to FIG. 1) according to the present disclosure may be related to a distance that the mirror 143 included in the BiODL 140 moves.

Figure 4:
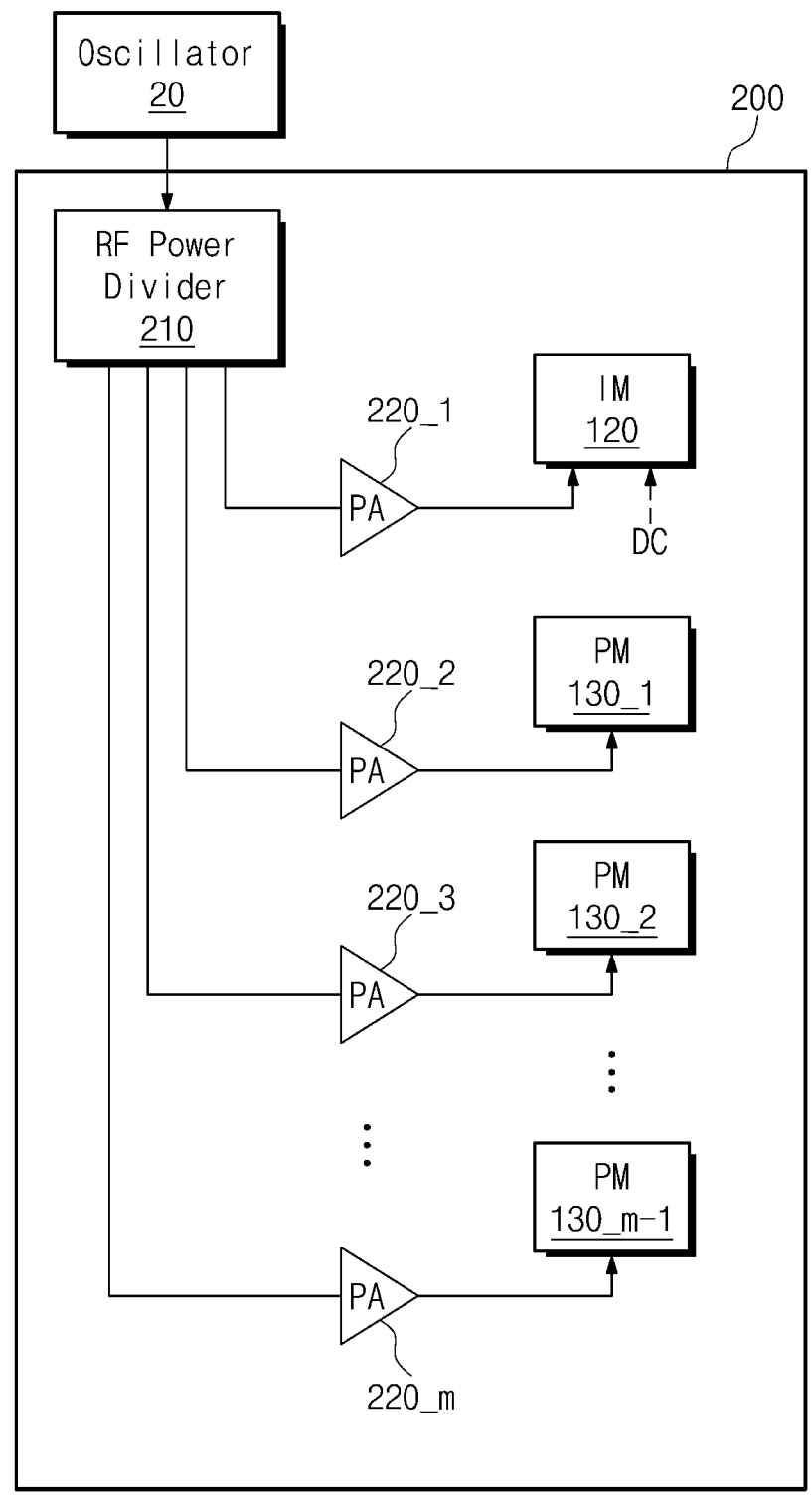
FIG. 4 is a diagram illustrating an electrical signal processor unit according to an embodiment of the present disclosure.

FIG. 4 is a diagram illustrating an electrical signal processor unit according to an embodiment of the present disclosure.

Referring to FIG. 4, the electrical signal processor unit 200 may include a RF power divider 210, the optical intensity modulator 120, RF power amplifiers 220_1, 220_2, 220_3, ..., and 220_m, and the optical phase modulators 130_1, 130_2, ..., and 130_m-1. The oscillator 20 may generate the electrical signal. The electrical signal generated from the oscillator 20 may be divided to 'm' signals by the RF power divider 210. The frequency repetition of the multi-channel optical signal generated by the present disclosure may be determined based on the frequency of the oscillator 20.

A first electrical signal divided by the RF power divider 210 may be amplified by the first RF power amplifier 220_1. The amplified first electrical signal may be applied to the optical intensity modulator 120. A DC voltage may be applied to the optical intensity modulator 120. The optical intensity modulator 120 may modulate the intensity of the input optical signal, based on the amplified first electrical signal and the DC voltage. A second electrical signal divided by the RF power divider 210 may be amplified by the second RF power amplifier 220_2. The amplified second electrical signal may be applied to the first optical phase modulator 130_1. The first optical phase modulator 130_1 may modulate the phase of the input optical signal, based on the amplified second electrical signal. As in the above description, m-th electrical signal divided by the RF power divider 210 may be amplified by the m-th RF power amplifier 220_m and then may be applied to the (m-1)-th optical phase modulator 130_m-1. The (m-1)-th optical phase modulator 130_m-1 may modulate the phase of the input optical signal, based on the amplified m-th electrical signal.

Figure 5:
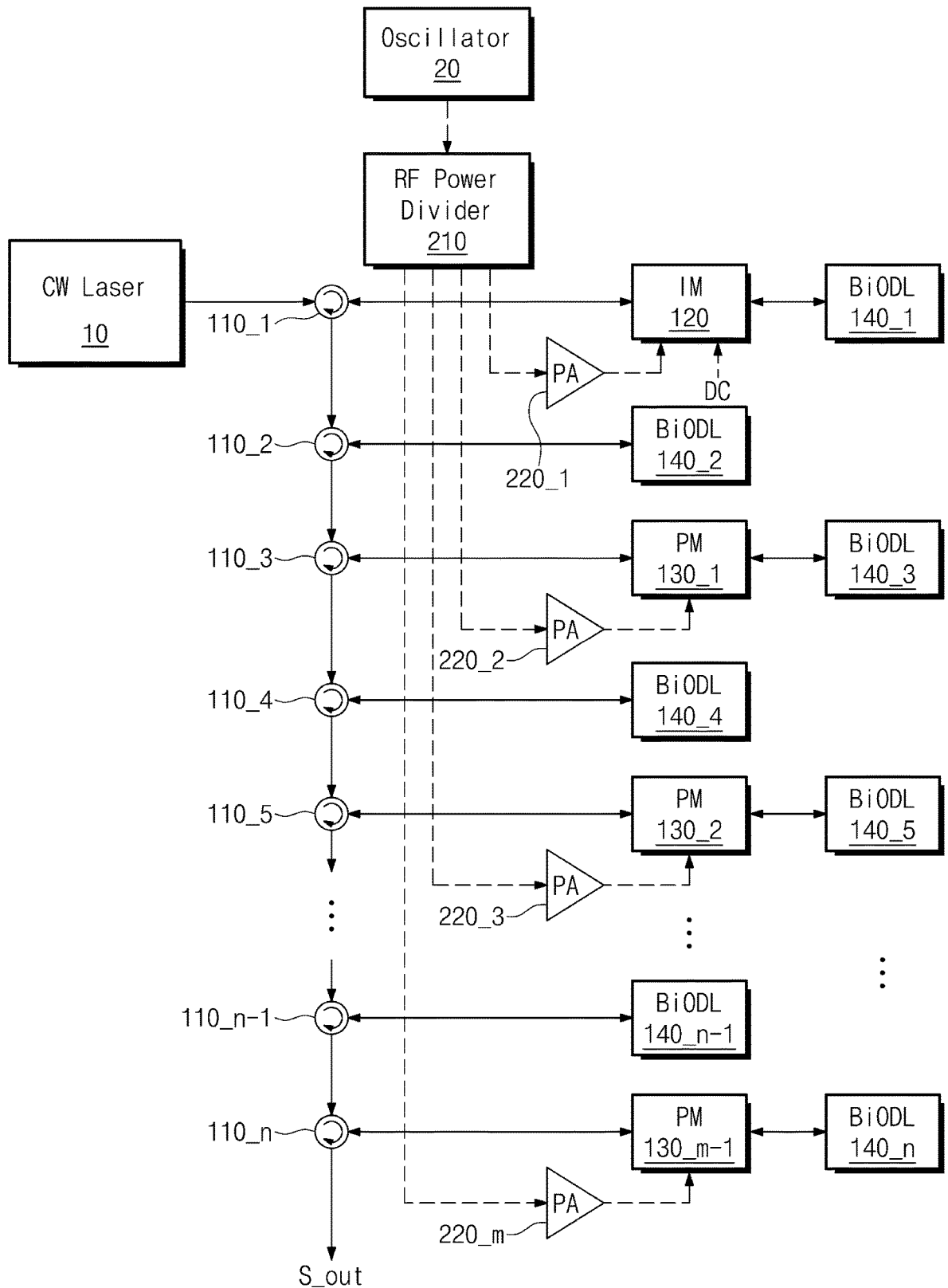
FIG. 5 is a diagram generally illustrating a multi-channel optical signal generating apparatus according to an embodiment of the present disclosure.

FIG. 5 is a diagram generally illustrating a multi-channel optical signal generating apparatus according to an embodiment of the present disclosure.

A multi-channel optical signal generating apparatus according to an embodiment of the present disclosure may be configured by a combination of the optical signal processor unit 100 (refer to FIG. 2) and the electrical signal processor unit 200 (refer to FIG. 4) illustrated in FIGS. 2 and 4. The multi-channel optical signal generating apparatus 1000 may include the CW laser 10, the oscillator 20, the RF power divider 210, the 'n' optical circulators 110_1, 110_2, 110_3, . . . , and 110_n, the 'm' RF power amplifiers 220_1, 220_2, 220_3, . . . , and 220_m, the one optical intensity modulator 120, the 'n' BiODLs 140_1, 140_2, 140_3, . . . , and 140_n, and the (m-1) optical phase modulators 130_1, 130_2, 130_3, . . . , and 130_m-1. The multi-channel optical signal generating apparatus 1000 illustrated in FIG. 5 represents a generalized embodiment, and the operation and principle of the multi-channel optical signal generating apparatus 1000 according to the present disclosure will be described in detail through an embodiment in FIG. 6 to be described later.

Figure 6:
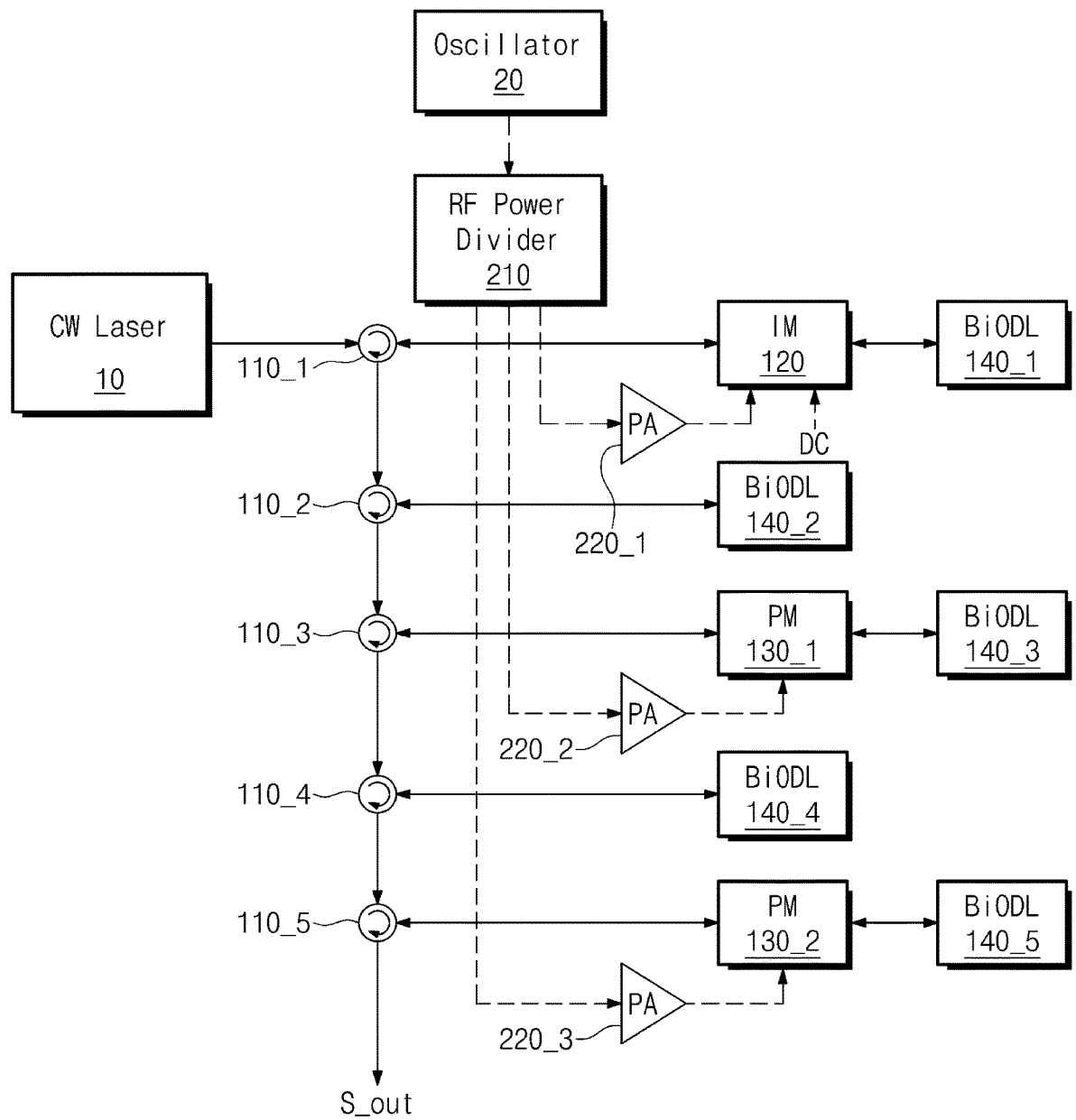
FIG. 6 is a diagram illustrating a multi-channel optical signal generating apparatus according to an embodiment of the present disclosure.

FIG. 6 is a diagram illustrating a multi-channel optical signal generating apparatus according to an embodiment of the present disclosure.

FIG. 6 illustrates an embodiment of the multi-channel optical signal generating apparatus 1000 illustrated in FIG. 5. A multi-channel optical signal generating apparatus 1000a in FIG. 6 may include the CW laser 10, the oscillator 20, the RF power divider 210, five optical circulators 110_1, 110_2, 110_3, 110_4, and 110_5, the one optical intensity modulator 120, the three RF power amplifiers 220_1, 220_2, and 220_3, the five BiODLs 140_1, 140_2, 140_3, 140_4, and 140_5, and the two optical phase modulators 130_1 and 130_2.

A single optical signal generated by the CW laser 10 may be input to the first optical circulator 110_1. The first optical circulator 110_1 may output the input signal in the clockwise direction. The single optical signal may be output from the first optical circulator 110_1 to the optical intensity modulator 120. The oscillator 20 may generate the electrical signal. The frequency repetition of the multi-channel optical signal may be determined based on the frequency of the oscillator 20. The electrical signal generated by the oscillator 20 may be output to the RF power divider 210 to be divided.

The first electrical signal output from the RF power divider 210 may be amplified by the first RF power amplifier 220_1. The first RF power amplifier 220_1 may supply RF power corresponding to 0.5 times an RF $V_\pi$ voltage applied to the optical intensity modulator 120. The amplified first electrical signal may be input to the optical intensity modulator 120. In addition, the DC voltage may be applied to the optical intensity modulator 120. The applied DC voltage may be a voltage corresponding to about 0.5 times or 1.5 times the DC $V_\pi$ voltage. The optical intensity modulator 120 may modulate the intensity of the input single optical signal, based on the amplified first electrical signal and the DC voltage.

The optical signal modulated by the optical intensity modulator 120 may be input to the first BiODL 140_1. The first BiODL 140_1 may adjust the phase of the input optical signal. The optical signal input to the first BiODL 140_1 may be reflected by the mirror 143 (refer to FIG. 3) after the optical path is adjusted to the parallel rays by the optical collimator 142 (refer to FIG. 3). The reflected optical signal may be re-inputted to the first optical intensity modulator 120. The frequency repetition of the output optical signal may be determined based on the distance that the mirror 143 included in the first BiODL 140_1 moves. The re-inputted optical signal may be intensity-modulated again by the first optical intensity modulator 120 and may be output to the first optical circulator 110_1.

The optical signal input to the first optical circulator 110_1 may be input to the second optical circulator 110_2, and the second optical circulator 110_2 may output the input optical signal to the second BiODL 140_2 that is located in the clockwise direction. The optical signal input to the second BiODL 140_2 is reflected by the mirror 143 after the optical path is adjusted by the optical collimator 142, is output from the second BiODL 140_2, and then may be input to the second optical circulator 110_2.

The optical signal input to the second optical circulator 110_2 is input to the third optical circulator 110_3, and the third optical circulator 110_3 may output the input optical signal to the first optical phase modulator 130_1 that is located in the clockwise direction. The second electrical signal output from the RF power divider 210 may be amplified by the second RF power amplifier 220_2. The second RF power amplifier 220_2 may supply RF power corresponding to a maximum voltage of the RF $V_\pi$ voltage applied to the first optical phase modulator 130_1. As an example, the applied RF maximum power may be 27 dBm. The amplified second electrical signal may be input to the first optical phase modulator 130_1. The first optical phase modulator 130_1 may modulate the phase of the input optical signal, based on the amplified second electrical signal. The phase modulated optical signal may be output to the third BiODL 140_3.

The optical signal input to the third BiODL 140_3 is reflected by the mirror 143 after the optical path is adjusted by the optical collimator 142, and then may be re-input to the first optical phase modulator 130_1. The optical signal re-input to the first optical phase modulator 130_1 may be phase modulated again and then may be output to the third optical circulator 110_3.

The optical signal input to the third optical circulator 110_3 is input to the fourth optical circulator 110_4, and the fourth optical circulator 110_4 may output the input optical signal to the fourth BiODL 140_4 that is located in the clockwise direction. The optical signal input to the fourth BiODL 140_4 is reflected by the mirror 143 after the optical path is adjusted by the optical collimator 142, is output from the fourth BiODL 140_4, and then may be input to the fourth optical circulator 110_4.

The optical signal input to the fourth optical circulator 110_4 may be input to the second optical phase modulator 130_2 and the fifth BiODL 140_5 through the fifth optical circulator 110_5. The optical signal input to the fifth BiODL 140_5 is reflected and re-input to the second optical phase modulator 130_2, and the optical signal may be phase modulated again. A method that the second optical phase modulator 130_2 and the fifth BiODL 140_5 process the optical signal is the same as the method that the first optical phase modulator 130_1 and the third BiODL 140_3 process the optical signal. The second optical phase modulator 130_2 may modulate the phase of the re-input optical signal, and then may output the modulated optical signal to the fifth optical circulator 110_5.

The optical signal input to the fifth optical circulator 110_5 may be changed into the multi-channel optical signal S_out while undergoing a plurality of modulation processes and may be output to the outside. The multi-channel optical signal S_out output to the outside may be a wavelength multiplexed CW optical signal. In the present disclosure, since double the intensity modulation effect and double the phase modulation effect occur by the combination of the optical circulators 110_1, 110_2, 110_3, 110_4, and 110_5 and the BiODLs 140_1, 140_2, 140_3, 140_4, and 140_5, a multi-channel formation effect may be increased while reducing the number of optical components and RF components that are used.

Figure 7:
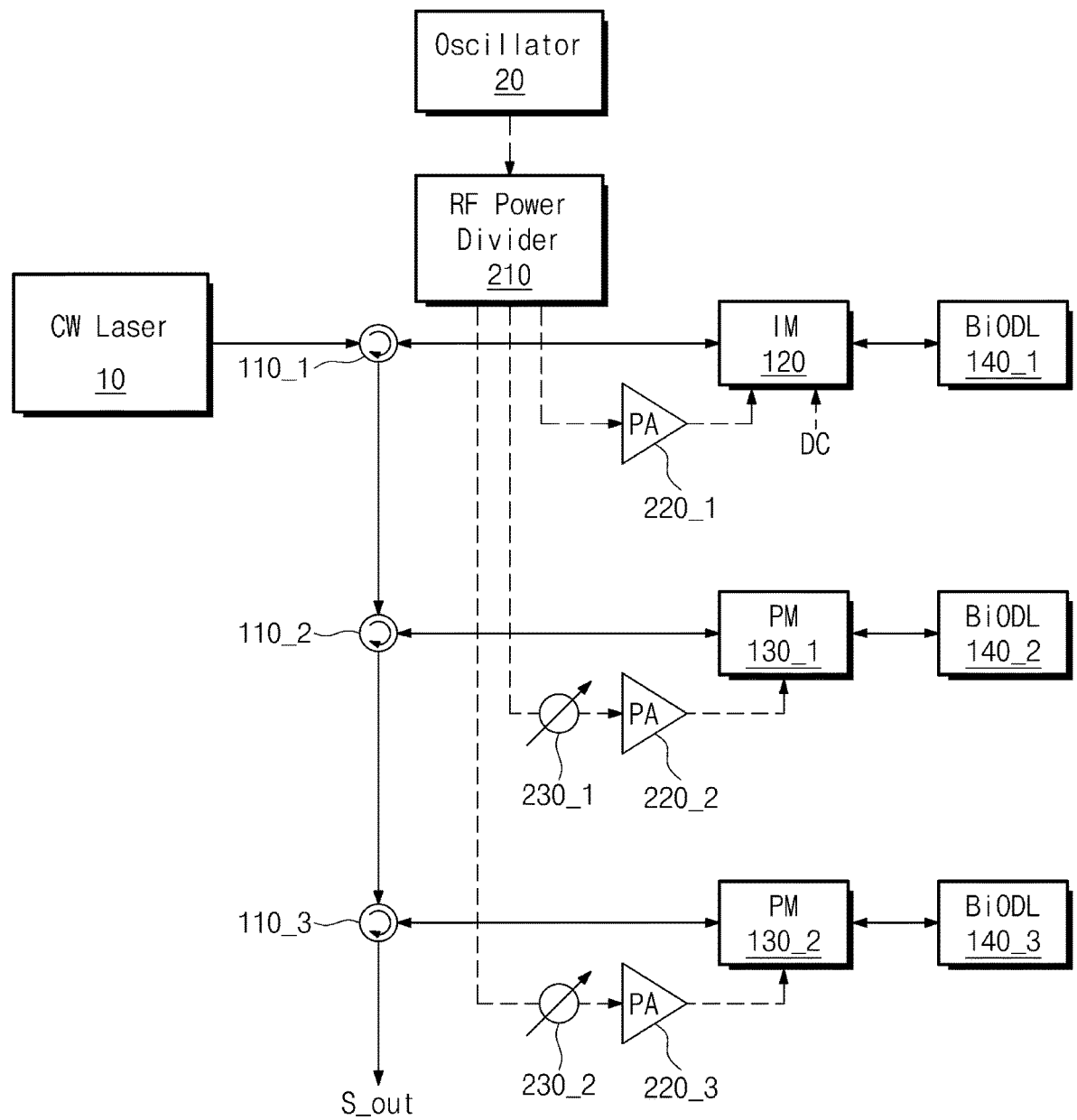
FIG. 7 is a diagram illustrating a multi-channel optical signal generating apparatus according to another embodiment of the present disclosure.

FIG. 7 is a diagram illustrating a multi-channel optical signal generating apparatus according to another embodiment of the present disclosure.

FIG. 7 illustrates another embodiment of the present disclosure in which some configurations are different from the multi-channel optical signal generating apparatus 1000a (refer to FIG. 6) illustrated in FIG. 6. A multi-channel optical signal generating apparatus 1000b illustrated in FIG. 7 illustrates the replacement of the combination of the second optical circulator 110_2 and the second BiODL 140_2 and the combination of the fourth optical circulator 110_4 and the fourth BiODL 140_4 that are included in the multi-channel optical signal generating apparatus 1000a illustrated in FIG. 6 with RF phase shifters 230_1 and 230_2.

The multi-channel optical signal generating apparatus 1000b illustrated in FIG. 7 may include the CW laser 10, the oscillator 20, the RF power divider 210, the three optical circulators 110_1, 110_2, and 110_3, the two RF phase shifters 230_1 and 230_2, the three RF power amplifiers 220_1, 220_2, and 220_3, the one optical intensity modulator 120, the two optical phase modulators 130_1, and 130_2, and the three BiODLs 140_1, 140_2, and 140_3. The operation and characteristics of the configurations other than the RF phase shifters 230_1 and 230_2 are the same as those of the configurations illustrated in FIG. 6.

The first RF phase shifter 230_1 may adjust phases of signals output from the optical intensity modulator 120 and the first optical phase modulator 130_1 to be in phase. The second RF phase shifter 230_2 may adjust the phases of signals output from the optical intensity modulator 120 and the second optical phase modulator 130_2 to be in phase. The multi-channel optical signal generating apparatus 1000b illustrated in FIG. 7 exhibits similar effects to the multi-channel optical signal generating apparatus 1000a illustrated in FIG. 6. However, as the frequency repetition of the generated multi-channel optical signal increases, since the price of the RF phase shifter increases, it is preferable to use a combination of an optical circulator and a BiODL in place of the RF phase shifter to reduce the price.

Figure 8:
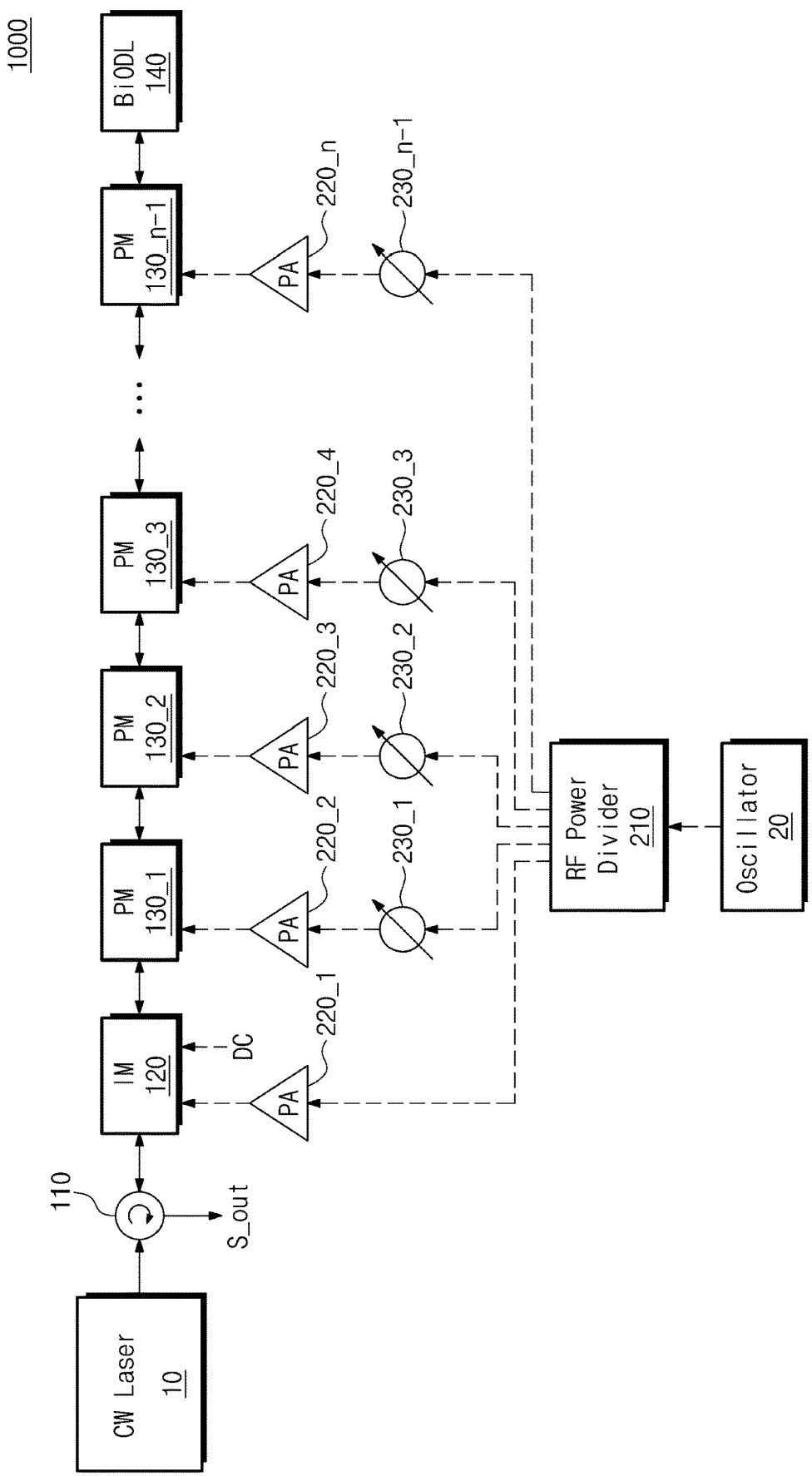
FIG. 8 is a diagram generally illustrating a multi-channel optical signal generating apparatus according to another embodiment of the present disclosure.

FIG. 8 is a diagram generally illustrating a multi-channel optical signal generating apparatus according to another embodiment of the present disclosure.

A multi-channel optical signal generating apparatus according to an embodiment of the present disclosure may be configured by the combination of the optical signal processor unit 100 (refer to FIG. 2) and the electrical signal processor unit 200 (refer to FIG. 4) illustrated in FIGS. 2 and 4. The multi-channel optical signal generating apparatus 1000 may include the CW laser 10, the oscillator 20, the RF power divider 210, the one optical circulator 110, the 'n' RF power amplifiers 220_1, 220_2, 220_3, . . . , and 220_n, the one optical intensity modulator 120, the one BiODL 140, the 'n'-1 optical phase modulators 30_1, 130_2, 130_3, . . . , and 130_n-1, and 'n'-1 RF phase shifter 230_1, 230_2, 230_3, . . . , and 230_n-1. The multi-channel optical signal generating apparatus 1000 illustrated in FIG. 8 is a generalized embodiment, and the operation and principle of the multi-channel optical signal generating apparatus 1000 according to the present disclosure will be described in detail through an embodiment in FIG. 9 to be described later.

Figure 9:
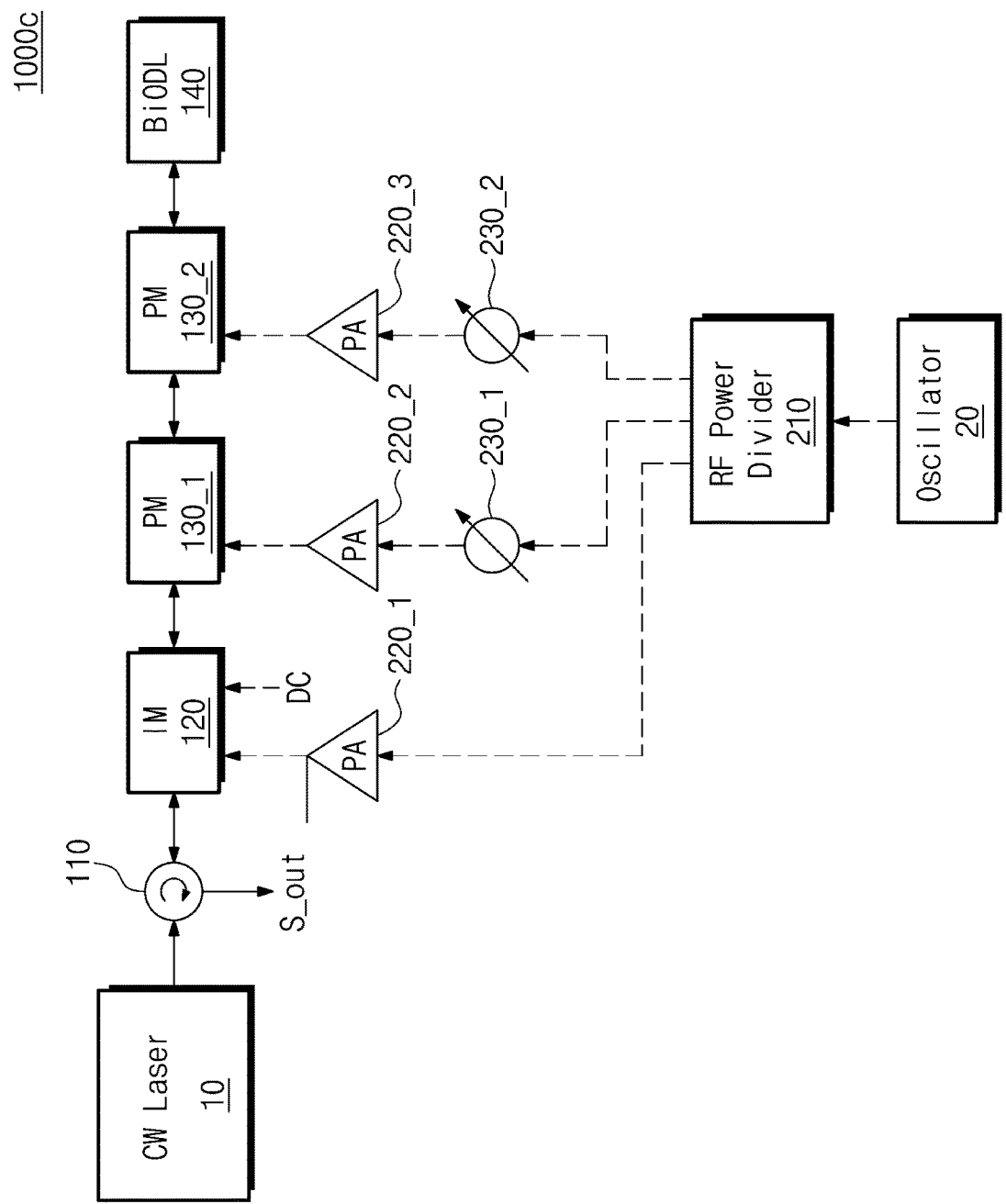
FIG. 9 is a diagram illustrating a multi-channel optical signal generating apparatus according to an embodiment of the present disclosure.

FIG. 9 is a diagram illustrating a multi-channel optical signal generating apparatus according to an embodiment of the present disclosure.

FIG. 9 illustrates an embodiment of the multi-channel optical signal generating apparatus 1000 illustrated in FIG. 8, and a multi-channel optical signal generating apparatus 1000c in FIG. 9 may include the CW laser 10, the oscillator 20, the RF power divider 210, the optical circulator 110, the optical intensity modulator 120, the three RF power amplifiers 220_1, 220_2, and 220_3, the BiODL 140, the two optical phase modulators 130_1 and 130_2, and the two RF phase shifters 230_1 and 230_2.

The single optical signal generated by the CW laser 10 may be input to the optical circulator 110. The optical circulator 110 may output the input signal in the clockwise direction. The single optical signal may be output from the optical circulator 110 to the optical intensity modulator 120. The oscillator 20 may generate the electrical signal. The frequency repetition of the multi-channel optical signal may be determined based on the frequency of the oscillator 20. The electrical signal generated by the oscillator 20 may be output to the RF power divider 210 to be divided.

The first electrical signal output from the RF power divider 210 may be amplified by the first RF power amplifier 220_1. The first RF power amplifier 220_1 may supply RF power corresponding to 0.5 times the RF $V_\pi$ voltage applied to the optical intensity modulator 120. The amplified first electrical signal may be input to the optical intensity modulator 120. In addition, the DC voltage may be applied to the optical intensity modulator 120. The DC voltage may be a voltage corresponding to about 0.5 times or 1.5 times the DC $V_\pi$ voltage. The optical intensity modulator 120 may modulate the intensity of the input single optical signal, based on the amplified first electrical signal and the DC voltage.

The optical signal modulated by the optical intensity modulator 120 may be output to the first optical phase modulator 130_1. The second electrical signal output from the RF power divider 210 may be input to the second RF power amplifier 220_2 through the first RF phase shifter 230_1. The second electrical signal may be amplified by the second RF power amplifier 220_2. The second RF power amplifier 220_2 may supply RF power corresponding to the maximum voltage of the RF $V_\pi$ voltage applied to the first optical phase modulator 130_1. For example, the applied RF maximum power may be 27 dBm. The amplified second electrical signal may be input to the first optical phase modulator 130_1. The first optical phase modulator 130_1 may modulate the phase of the input optical signal, based on the amplified second electrical signal. The phase modulated optical signal may be provided to the second optical phase modulator 130_2.

A third electrical signal output from the RF power divider 210 may be provided to the second optical phase modulator 130_2 through the second RF phase shifter 230_2 and the third RF power amplifier 220_3. The second optical phase modulator 130_2 may modulate the phase of the optical signal, based on the electrical signal provided from the third RF power amplifier 220_3. The modulated optical signal may be input to the BiODL 140 and may be reflected by the BiODL 140.

The reflected optical signal may be output after phase modulation is performed once again by the second optical phase modulator 130_2. The modulated optical signal output from the second optical phase modulator 130_2 may be output after phase modulation is performed once again by the first optical phase modulator 130_1. The modulated optical signal output from the first optical phase modulator 130_1 may be input to the optical intensity modulator 120 and may be amplitude modulated. The modulated optical signal output from the optical intensity modulator 120 may be output to the outside through the optical circulator 110.

Figure 10:
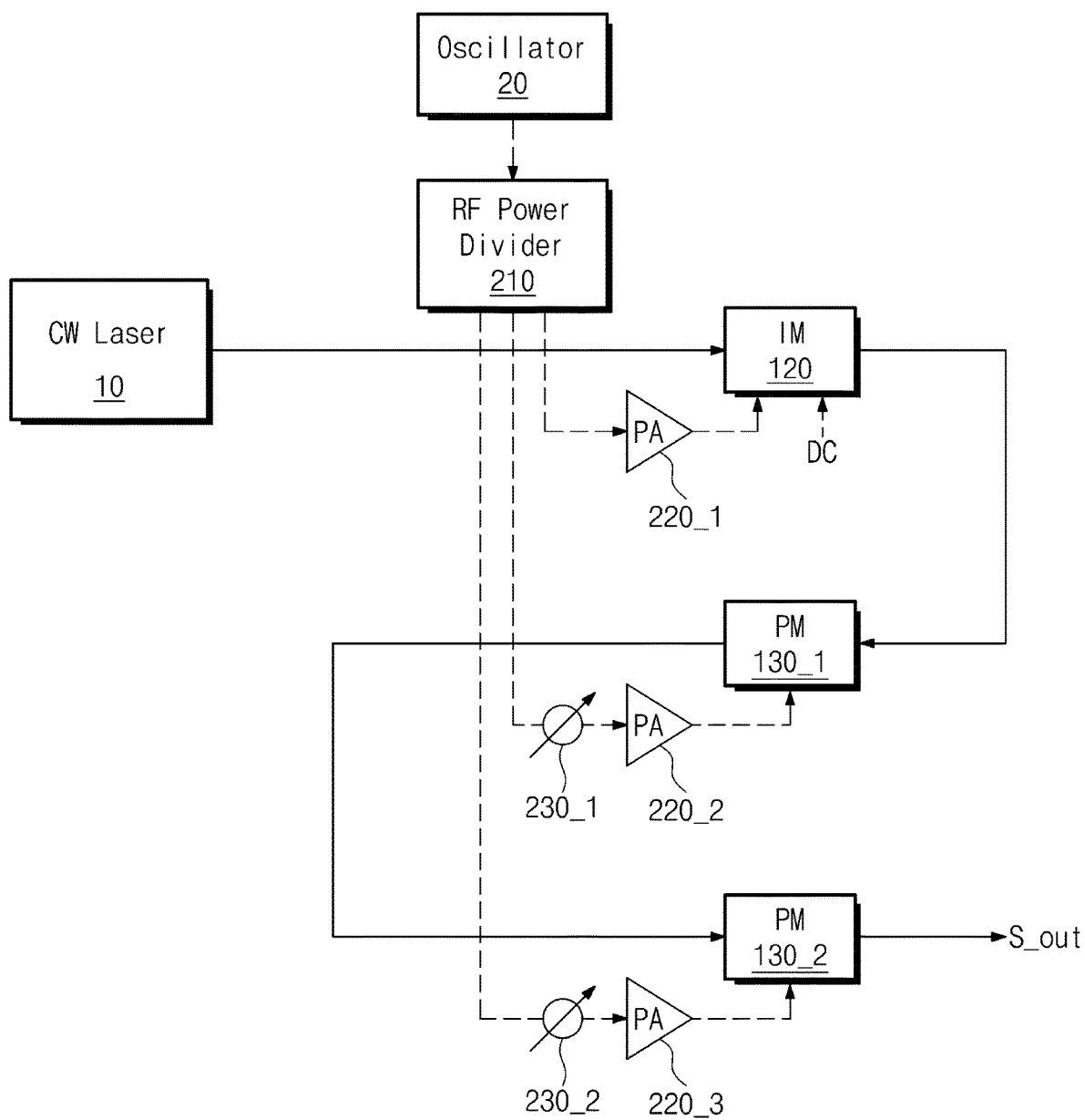
FIG. 10 is a diagram illustrating a multi-channel optical signal generating apparatus that is generally used.

FIG. 10 is a diagram illustrating a multi-channel optical signal generating apparatus that is generally used.

FIG. 10 illustrates a multi-channel optical signal generating apparatus that does not include the combination of the optical circulators 110_1, 110_2, . . . , 110_n-1, and 110_n (refer to FIG. 2) and the BiODLs 140_1, 140_2, . . . , and 140_n (refer to FIG. 2). In FIG. 10, the single optical signal generated from the CW laser 10 may be input to the optical intensity modulator 120. The electrical signal generated from the oscillator 20 may be divided by the RF power divider 210. The frequency repetition of the multi-channel optical signal generated by the present disclosure may be determined based on the frequency of the oscillator 20.

The first electrical signal divided by the RF power divider 210 may be amplified by the first RF power amplifier 220_1 and may be input to the optical intensity modulator 120. The first RF power amplifier 220_1 may supply RF power corresponding to about 0.5 times the RF (Radio Frequency) $V_\pi$ voltage of the optical intensity modulator 120. The DC voltage may be applied to the optical intensity modulator 120. The applied DC voltage may be a voltage of about 0.5 times or 1.5 times the voltage of DC V. The single optical signal input to the optical intensity modulator 120 may be intensity modulated based on the first electrical signal and the DC voltage, and then may be output to the first optical phase modulator 130_1.

The second electrical signal divided by the RF power divider 210 may be phase adjusted by the first RF phase shifter 230_1 and then may be amplified by the second RF power amplifier 220_2. The first RF phase shifter 230_1 may adjust phases of signals output from the optical intensity modulator 120 and the first optical phase modulator 130_1 to be in phase. The adjusted second electrical signal output from the second RF power amplifier 220_2 may be input to the first optical phase modulator 130_1. The second RF power amplifier 220_2 may supply RF power corresponding to the maximum voltage applied to the first optical phase modulator 130_1. As an example, the applied RF maximum power may be about 27 dBm. The intensity modulated optical signal may be output to the second optical phase modulator 130_2 after the optical phase is modulated based on the phase adjusted and amplified second electrical signal.

The third electrical signal divided by the RF power divider 210 may be phase adjusted by the second RF phase shifter 230_2 and then may be amplified by the third RF power amplifier 220_3. The second RF phase shifter 230_2 may adjust the phases of signals output from the optical intensity modulator 120 and the second optical phase modulator 130_2 to be in phase. The adjusted third electrical signal output from the third RF power amplifier 220_3 may be input to the second optical phase modulator 130_2. The third RF power amplifier 220_3 may supply RF power corresponding to the maximum voltage applied to the second optical phase modulator 130_2. As an example, the applied RF maximum power may be about 27 dBm. The optical signal output from the second optical phase modulator 130_2 may be output to the outside after the optical phase is modulated based on the phase adjusted and amplified third electrical signal.

As a result of simulation of the multi-channel optical signal generating apparatus illustrated in FIG. 10, the number of signal lines within 1 dB of the finally output multi-channel optical signal is approximately 35. Meanwhile, as a result of simulation of the multi-channel optical signal generating apparatus 1000a (refer to FIG. 6) illustrated in FIG. 6, the number of signal lines within 1 dB of the finally output multi-channel optical signal is approximately 65. In addition, as a result of simulation of the multi-channel optical signal generating apparatus 1000b (refer to FIG. 7) illustrated in FIG. 7, the number of signal lines within 1 dB of the finally output multi-channel optical signal is approximately 65. In addition, as a result of simulation of the multi-channel optical signal generating apparatus 1000c (refer to FIG. 9) illustrated in FIG. 9, the number of signal lines within 1 dB of the finally output multi-channel optical signal is approximately 65. From the simulation results, it may be confirmed that the multi-channel optical signal generating apparatuses 1000a, 1000b, and 1000c according to the present disclosure have about 2 times improved performance compared to a multi-channel optical signal generating apparatus that is generally used.

According to an embodiment of the present disclosure, a multi-channel optical signal generating apparatus may reduce power consumed and an amount of heat generated when a multi-channel optical signal is generated.

According to an embodiment of the present disclosure, a multi-channel optical signal generating apparatus may reduce the number of optical components and RF components included in the multi-channel optical signal generating apparatus, and accordingly, the multi-channel optical signal generating apparatus may be implemented at low cost.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A multi-channel optical signal generating apparatus comprising:
   a continuous wave (CW) laser configured to generate a single optical signal;
   an optical signal processor unit configured to process the single optical signal;
   an oscillator configured to generate an electrical signal; and
   an electrical signal processor unit configured to generate a modulation signal for modulating the single optical signal, based on the electrical signal, and
   wherein the optical signal processor unit includes 'n' optical circulators, at least one optical intensity modulator, (m-1) optical phase modulators, and 'n' bidirectional inline optical delay lines (BiODLs),
   wherein the electrical signal processor unit includes a radio frequency (RF) power divider which divides the electrical signal, and 'm' RF power amplifiers,
   wherein the RF power divider divides the electrical signal into 'm' divided electrical signals, and
   wherein the optical signal processor unit modulates and outputs the single optical signal by the at least one optical intensity modulator and the (m-1) optical phase modulators, based on one of the 'm' divided electrical signals.

2. The multi-channel optical signal generating apparatus of claim 1, wherein each of the 'n' BiODLs includes an input/output port, an optical collimator, and a mirror.

3. The multi-channel optical signal generating apparatus of claim 2, wherein the mirror is movable in a horizontal direction within each of the 'n' BiODLs.

4. The multi-channel optical signal generating apparatus of claim 3, wherein a moving distance of the mirror is proportional to a frequency repetition of generated multi-channel optical signals.

5. The multi-channel optical signal generating apparatus of claim 1, wherein the 'n' is 5, and the 'm' is 3.

6. The multi-channel optical signal generating apparatus of claim 1, wherein the CW laser is a semiconductor laser diode.

7. The multi-channel optical signal generating apparatus of claim 1, wherein each of the 'n' optical circulators adjusts an optical path clockwise.

8. The multi-channel optical signal generating apparatus of claim 1, wherein the at least one optical intensity modulator includes a direct current (DC) voltage input port.

9. A multi-channel optical signal generating apparatus comprising:
- a continuous wave (CW) laser configured to generate a single optical signal;
- an oscillator configured to generate an electrical signal;
- a radio frequency (RF) power divider configured to generate a plurality of divided electrical signals by distributing the electrical signal;
- a first block including a first RF power amplifier configured to amplify a first divided electrical signal of the plurality of divided electrical signals, an optical intensity modulator configured to modulate an amplitude of the optical signal, based on the amplified first divided electrical signal, and a first bidirectional inline optical delay line (BiODL) configured to adjust phases of the amplitude modulated optical signal to be in phase and to reflect the optical signal adjusted to be in phase;
- a first optical circulator configured to adjust a path of the optical signal, of which the amplitude is modulated and the phase is adjusted by the first block;
- a second block including an RF phase shifter configured to adjust a phase of a second divided electrical signal of the plurality of divided electrical signals, a second RF power amplifier configured to amplify the phase adjusted second divided electrical signal, an optical phase modulator configured to modulate a phase of the optical signal of which path is adjusted by the first optical circulator, based on the amplified second divided electrical signal, and a second BiODL configured to adjust phases of the phase modulated optical signal to be in phase and to reflect the optical signal adjusted to be in phase; and
- a second optical circulator configured to adjust a path of the optical signal, of which the phase is modulated and adjusted by the second block.

10. The multi-channel optical signal generating apparatus of claim 9, wherein each of the first BiODL and the second BiODL includes an input/output port, an optical collimator, and a mirror.

11. The multi-channel optical signal generating apparatus of claim 10, wherein the mirror is movable in a horizontal direction within each of the first BiODL and the second BiODL.

12. The multi-channel optical signal generating apparatus of claim 11, wherein a moving distance of the mirror is proportional to a frequency repetition of generated multi-channel optical signals.

13. The multi-channel optical signal generating apparatus of claim 9, wherein the CW laser is a semiconductor laser diode.

14. The multi-channel optical signal generating apparatus of claim 9, wherein the optical intensity modulator includes a direct current (DC) voltage input port.

15. A multi-channel optical signal generating apparatus comprising:
- a continuous wave (CW) laser configured to generate a single optical signal;
- an oscillator configured to generate an electrical signal;
- a radio frequency (RF) power divider configured to generate a plurality of divided electrical signals by distributing the electrical signal;
- an optical circulator configured to adjust a path of the optical signal;
- at least one amplitude modulator including a first RF power amplifier and an optical intensity modulator, and configured to modulate an amplitude of the optical signal by the optical intensity modulator, based on a first divided electrical signal amplified by the first RF power amplifier among the plurality of divided electrical signals;
- at least one optical phase modulator including an RF phase shifter, a second RF power amplifier, and an optical phase modulator, and configured to modulate a phase of the optical signal by the optical phase modulator, based on a second divided electrical signal which is phase adjusted by the RF phase shifter and amplified by the second RF power amplifier among the plurality of divided electrical signals; and
- a bidirectional inline optical delay line (BiODL) configured to adjust phases of the amplitude and phase modulated optical signal which is modulated by the at least one amplitude modulator and the at least one optical phase modulator to be in phase, and to reflect the optical signal adjusted to be in phase.

16. The multi-channel optical signal generating apparatus of claim 15, wherein the BiODL includes an input/output port, an optical collimator, and a mirror.

17. The multi-channel optical signal generating apparatus of claim 15, wherein the mirror is movable in a horizontal direction within the BiODL.

18. The multi-channel optical signal generating apparatus of claim 17, wherein a moving distance of the mirror is proportional to a frequency repetition of generated multi-channel optical signals.

* * * * *